United States Patent [19]

Bos et al.

[11] 4,279,017

[45] Jul. 14, 1981

[54] METHOD AND DEVICE FOR DETECTING THE PRESENCE OF ONE OR MORE PULSE CODE MODULATED MULTI-FREQUENCY CODE SIGNALS

[75] Inventors: Bernardus W. Bos, Leidschendam; Harke M. Wijbenga, Zoetermeer, both of Netherlands

[73] Assignee: Staat der Nederlanden (Staatsbedrijf der Posterijen, Telegrafie en Telefonie), The Hague, Netherlands

[21] Appl. No.: 68,406

[22] Filed: Aug. 21, 1979

[30] Foreign Application Priority Data

Sep. 8, 1978 [NL] Netherlands .......................... 7809213

[51] Int. Cl.³ ...................... G06F 15/20; G01R 23/14
[52] U.S. Cl. ............................... 364/484; 179/84 VF; 328/138
[58] Field of Search ................... 364/484; 179/84 VF; 328/138, 139

[56] References Cited

U.S. PATENT DOCUMENTS

| | | | |
|---|---|---|---|
| 3,882,283 | 5/1975 | Proudfoot | 179/84 VF |
| 3,962,645 | 6/1976 | Stewart | 328/138 X |
| 4,068,309 | 1/1978 | Drukarch | 364/484 |
| 4,109,109 | 8/1978 | Mooleron | 179/84 VF X |

*Primary Examiner*—Jerry Smith
*Attorney, Agent, or Firm*—Hugh Adam Kirk

[57] ABSTRACT

According to the method of the invention two successive samples from each of two signal channels to be detected are alternately fed and not fed to the detection device. In consequence of this, fewer interference products are obtained, so that the processing time can remain relatively short. Moreover the two multi-frequency code samples (MFC-samples) of two channels can be processed simultaneously. A device (FIG. 3) examines on a time division basis the signalling time slots of two pulse code modulated frames of multi-channel signals (PCM-frames). Under the control of a microprocessor circuit (27) the pulse code modulated selected multi-frequency signal samples are processed in an input control circuit (28) when they are correlated with one another by being multiplied by sine and cosine reference series signals from a buffer (29). The correlation results are fed to accumulators (30, 33). Under the control of a second microprocessor circuit (40) the correlation results are compared in a processing circuit and transferred to the equipment that follows.

13 Claims, 8 Drawing Figures

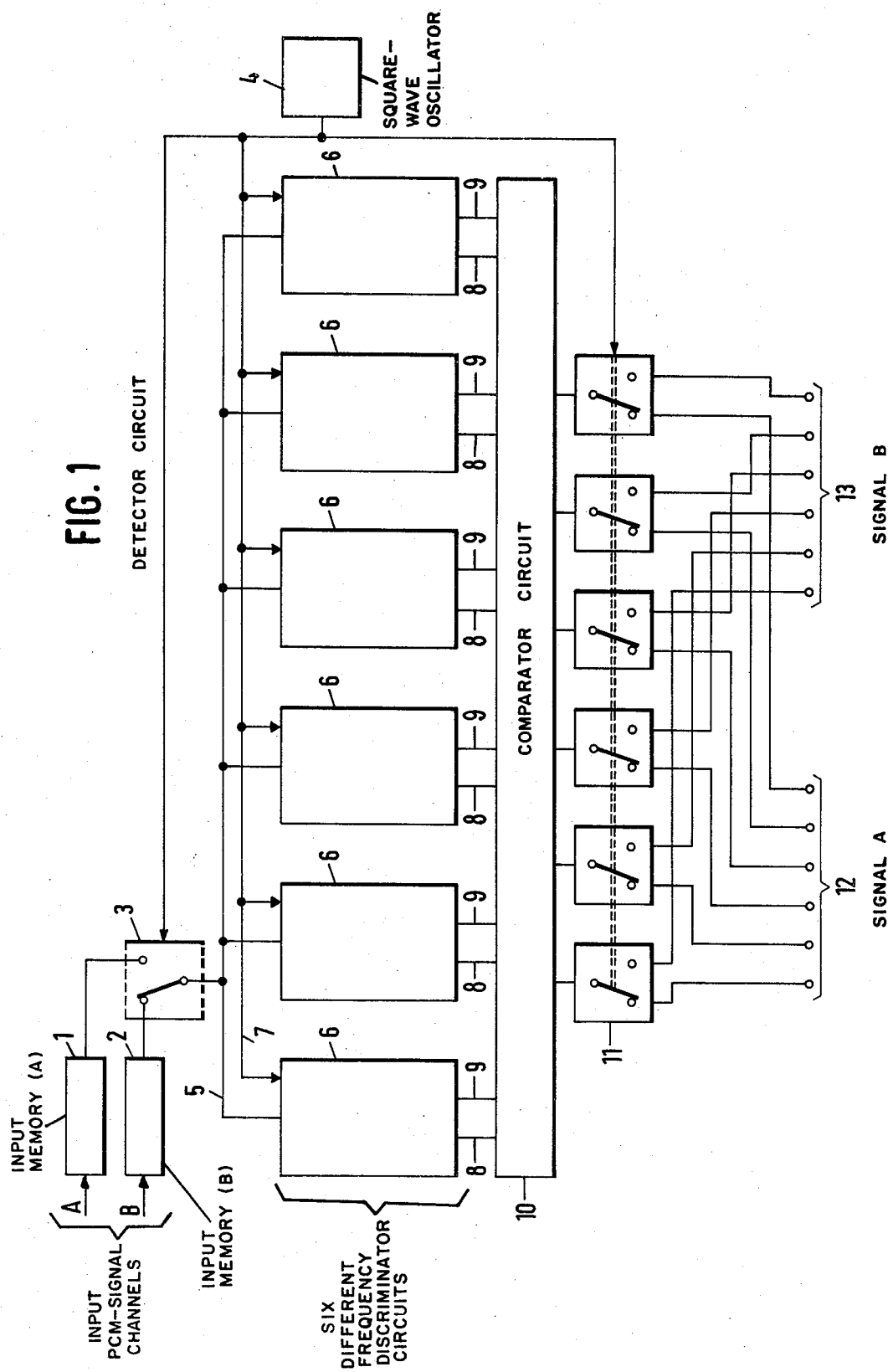

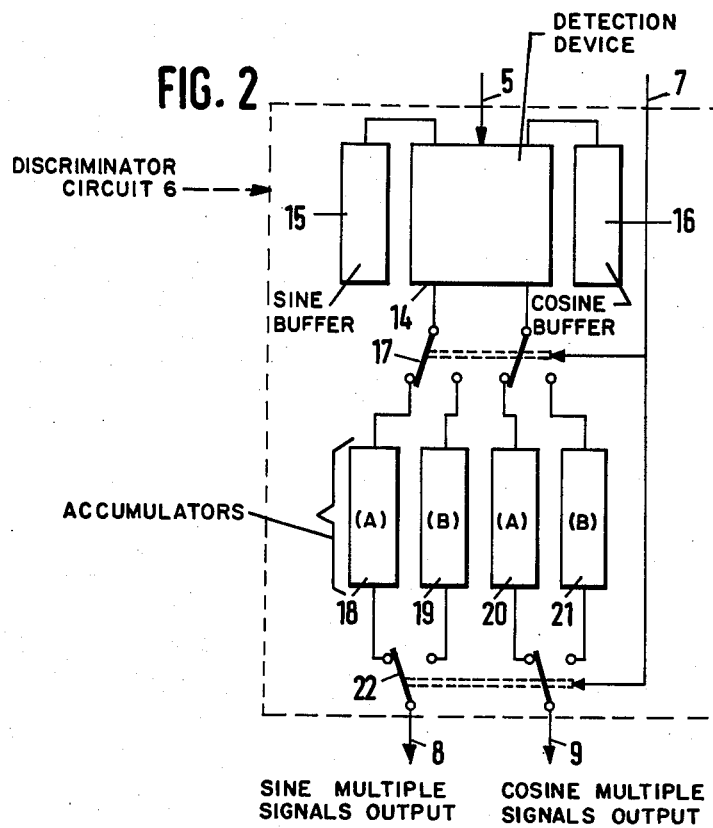
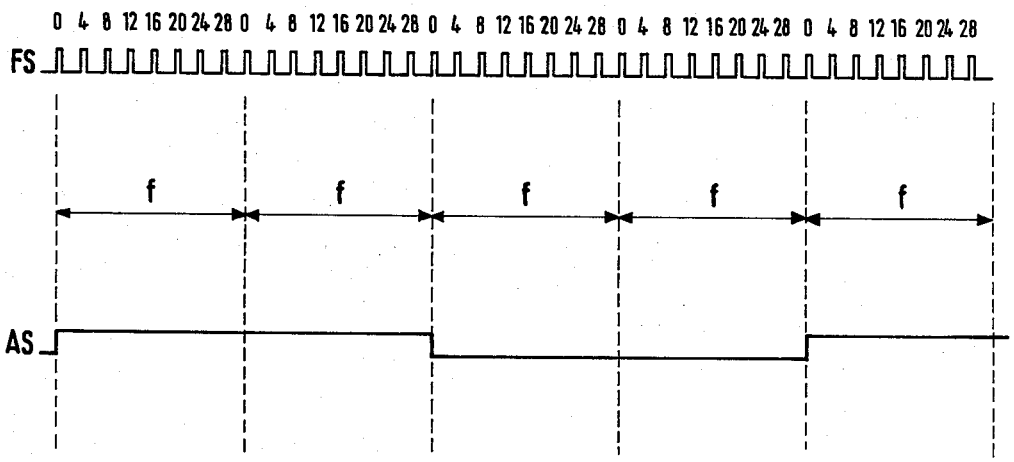

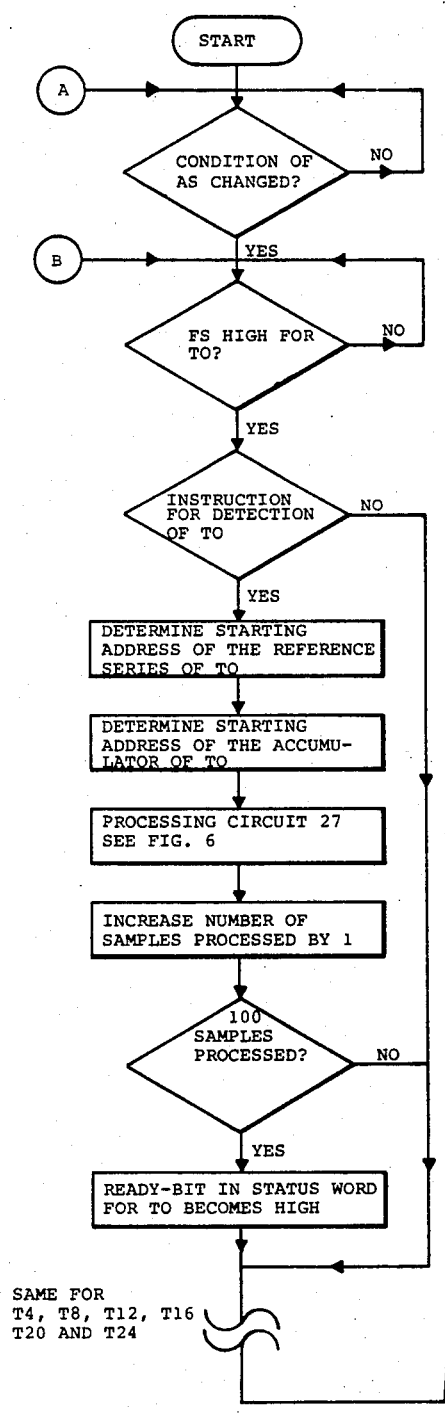
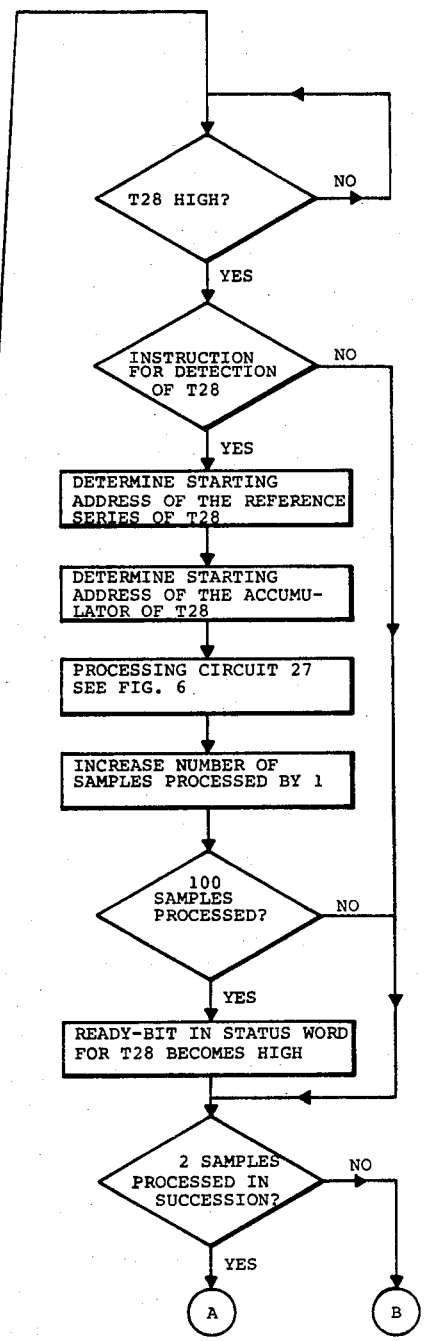
FIG. 5
FLOW CHART FOR INPUT CONTROL CIRCUIT 28 IN FIG. 3

FLOW CHART FOR INPUT PROCESSOR CIRCUIT 27 IN FIG. 3

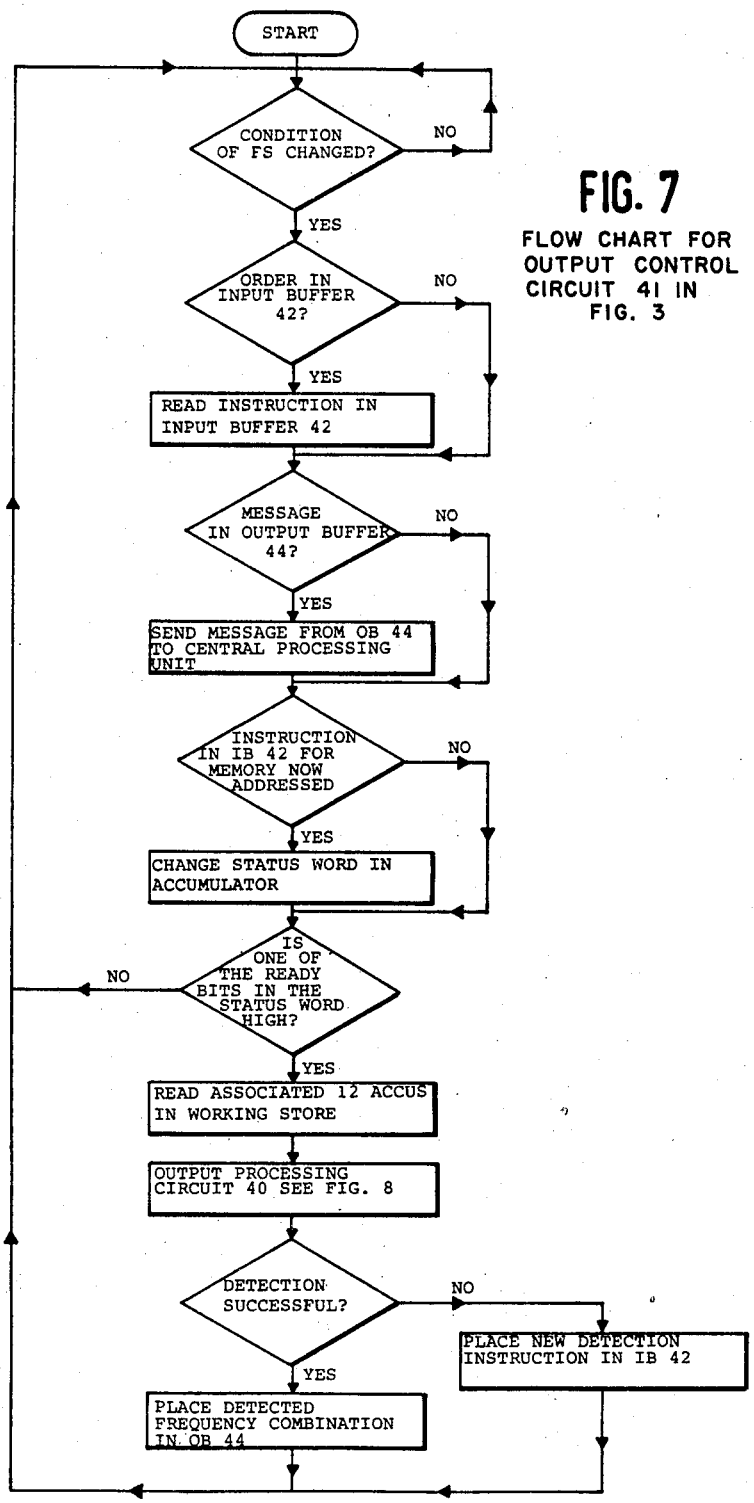

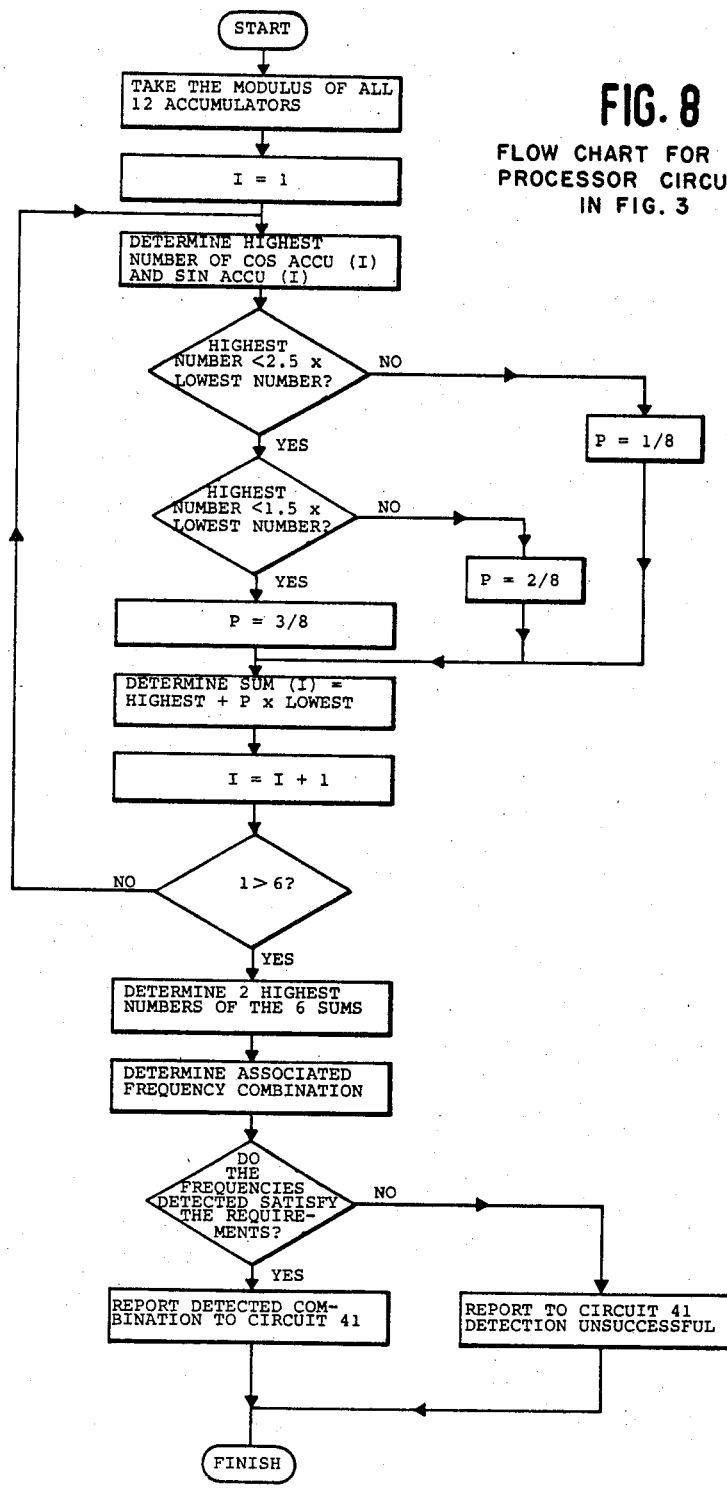

METHOD AND DEVICE FOR DETECTING THE PRESENCE OF ONE OR MORE PULSE CODE MODULATED MULTI-FREQUENCY CODE SIGNALS

BACKGROUND OF THE INVENTION

The invention relates to a method and a device for detecting the presence or absence of one or more of a fixed number of certain frequencies within a pulse code modulated (PCM) signal, the signal to be investigated being multiplied by each of two reference series for each of the said certain frequencies.

A method and device of this kind are known from Proudfoot U.S. Pat. No. 3882283 issued May 6, 1975.

The method and device are applied in telecommunication exchanges in detecting voice-frequency signalling signals, such as different frequencies corresponding to digits on pushbuttons or on a dial of a telephone set contained in a telecommunication channel itself or in a separate signalling channel.

As detection devices for signalling purposes are widely used in telecommunication exchanges, it is clearly desirable that each detection device is used as efficiently as possible, so that space can be saved in the construction of the exchange and an economically more attractice solution is found. On the other hand, the standards to be met by the detection devices have been laid down in CCITT-recommendations Q440-Q458, which show that detection has to take place within a rather short time even if the frequencies received are somewhat different from the ones expected.

Although the device described in the above-mentioned patent is reasonably insensitive to inaccuracies in the frequency of the signals received, the components of the device are not used very efficiently. An improvement has been realized with the method and device described in applicants' asignees Drukarch U.S. Pat. No. 4068309 issued Jan. 10, 1978, but the latter has the drawback of being sensitive to frequency deviations and level variations of the signal. Both devices have the disadvantage that they cannot properly handle the occurring sum and difference frequencies.

The object of the invention is to provide a method and device which, starting from those described in the Proudfoot U.S. Pat. No. 3882283, yield a more efficient use of the equipment and more reliable detection.

SUMMARY OF THE INVENTION

The invention is based on the insight that twice as many samples of the signal to be detected are available as are needed for reliable detection according to the sampling theorem, so that half of the samples can remain unused.

However, in practice it proves to be impossible to use and not use successive samples alternately. Further, if the detection time is too short or too long this may lead to the introduction of too many sum and difference frequencies.

The method according to the invention is characterized in that sets of two subsequent ones of the samples available for detection within a PCM signal are alternately used and not used for detection. An improvement of the said method consists in that the number of samples used for detection is equal or practically equal to half a whole multiple of the number of samples which, at the sampling frequency, represent one period of the difference frequency of the said certain frequencies.

Furthermore, the invention provides a device for carrying out the first-mentioned method, which device comprises the means of comparing alternately two samples of a first PCM-signal and two samples of a second PCM-signal with the samples of the reference series, and means for feeding the results of this comparison alternately in the same rhythm to the detection device. As one relatively expensive and large detection device can be used for the signals of two channels instead of two detection devices, i.e. one detection device for each channel, an attractive solution is realized.

BRIEF DESCRIPTION OF THE VIEWS

The above mentioned and other features, objects and advantages, and the manner of attaining them are described more specifically below by reference to embodiments of this invention shown in the accompanying drawings, wherein:

FIG. 1 a general schematic block wiring diagram of a device according to the invention for alternate processing of the signals from two different PCM-channels;

FIG. 2 a schematic block wiring diagram of one of the discriminator circuits 6 shown in FIG. 1;

FIG. 3 a schematic block wiring diagram of a device according to the invention for time division processing of the signalling information from sixteen channels similar to the system disclosed in FIG. 1 for two channels;

FIG. 4 a waveform time-diagram showing the situation in time of the time slots (FS) containing the signalling information and the switching frequency (AS) according to the invention;

FIG. 5 a flowchart for the functional description of input control circuit 28 of FIG. 3;

FIG. 6 a flowchart for the functional description of input processing circuit 27 of FIG. 3;

FIG. 7 a flowchart for the functional description of output control circuit 41 of FIG. 3, and FIG. 8 a flowchart for the functional description of output processing circuit 40 of FIG. 3.

DETAILED DESCRIPTION OF PREFERRED EMBODIMENTS

Figure 3:
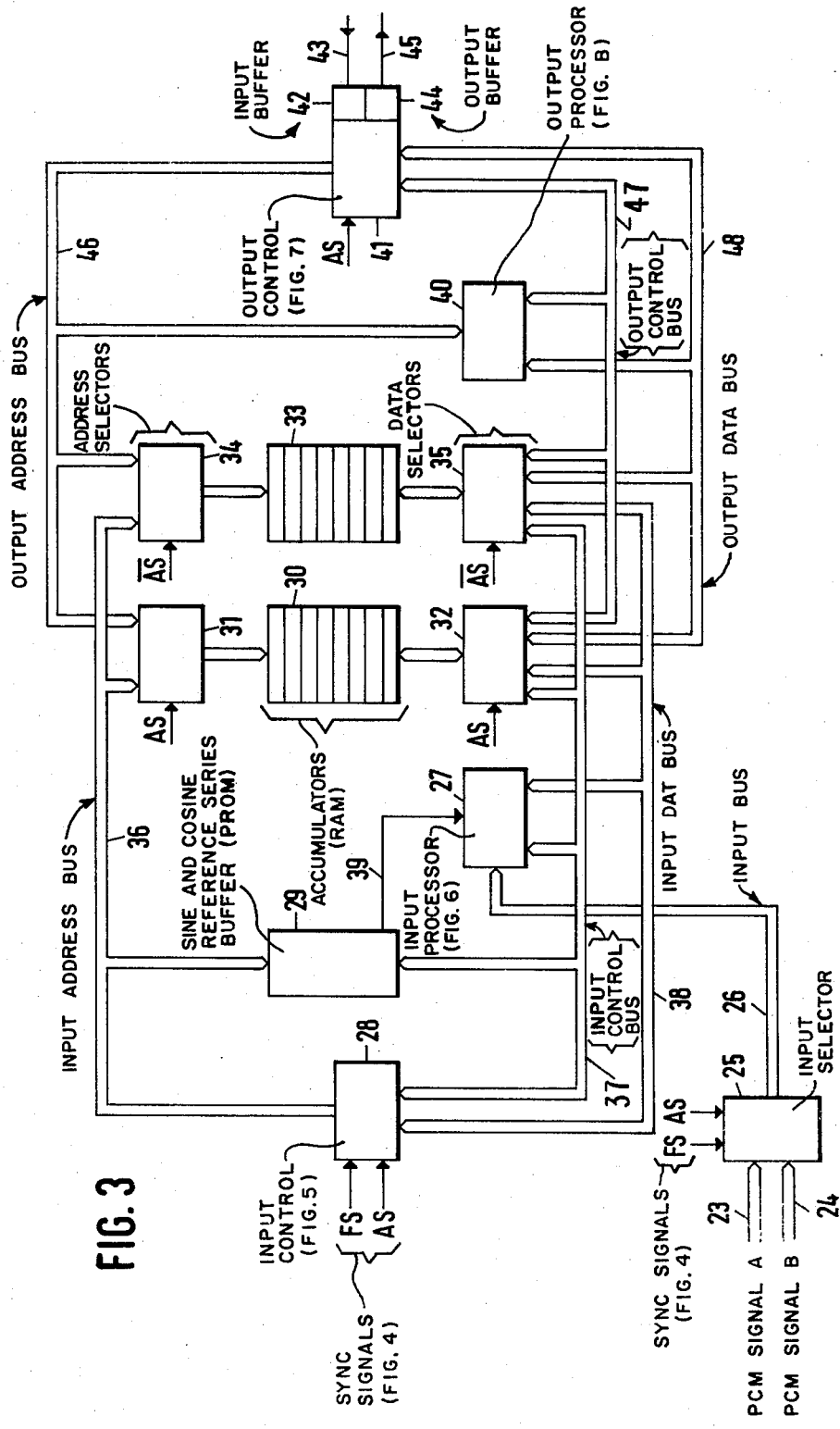

The block diagram of FIG. 1 comprises an input memory 1 for the incoming series of signals of a first PCM-signal channel A and an input memory 2 for an incoming series of signals of a second PCM-signal channel B.

A switch 3 provides for throughconnection of the series of signals. According to the invention, a square-wave oscillator 4 controls switch 3 in such a way that two samples from each of the input memories 1 and 2 are alternately connected to the detector circuit of this invention. Square-wave oscillator 4 is synchronized with the incoming signal in the known manner (not shown). The signal coming from switch 3 is fed via a common input 5 to each of discriminators 6, each of the latter being suitable for the discrimination of one frequency. The construction and operation of a discriminator 6 is described later with the aid of FIG. 2. Each discriminator 6 is equipped with an input 7 for reception of the square-wave signal of oscillator 4. Further, the discriminators 6 each have an output 8, at which alternately appears an accumulated value of a comparison of a sine sample of signals A and B, respectively, and an output 9 at which appears a similar value of the comparison with a cosine sample of signals A and B. Outputs 8 and 9 are connected to a known comparator circuit 10. The outputs of comparator circuit 10 are conducted to switches 11, which according to the invention are controlled by oscillator 4. On each of the six outputs 12 a signal may now appear which is representative of each of the frequencies found in signal A, respectively. If for instance of two-out-of-six signalling code is applied, only two of the outputs 12 will be simultaneously "high" for example and the other four "low". On outputs 13 an identical situation is found for the frequencies encountered within signal B.

FIG. 2 presents a more detailed diagram of one of the discriminators 6 of FIG. 1. Each of these discriminators 6 is suitable for one of the six frequencies. The signal from input 5 is fed to a known detection device 14, which signal is multiplied by a sine reference series of the frequency concerned stored in a buffer 15, and in a buffer 16 by a cosine reference series of the frequency concerned. The result of both multiplications is fed via two switches 17 to two of four accumulators 18, 19, 20 and 21. The results of the multiplication of signal A by the sine reference series are stored in accumulator 18; those for signal B in accumulator 19. The results of the multiplication of the signals from PCM-signals A and B with the cosine reference series are accumulated in accumulators 20 and 21, respectively.

Via two switches 22, which according to the invention are controlled by square-wave oscillator 4 (FIG. 1), the accumulation products are fed to outputs 8 and 9.

Where the function and operation of the components mentioned are either generally known or are described, in particular, in the Proudfoot U.S. Pat. No. 3,882,283, they will not be further discussed here.

A considerable saving is achieved by the fact that the most complicated parts of the circuit, such as detection device 14 (FIG. 2) and comparator circuit 10 (see FIG. 1) are used twice as efficiently as in the known circuits, without the processing speed being increased. As stated above, this is realized according to the invention by alternately using and not using two samples of each of signals A and B. Theoretically it is possible to make another choice, for instance the alternate use and non-use of a single sample. However, if the frequencies received vary by approx. 10 Hz, as is allowed according to CCITT recommendation Q455, so many modulation products prove to occur in practice, that reliable detection within the time mentioned in the recommendation is no longer possible. Practical tests have shown that the alternate use and non-use of two samples with the most extreme ones of the values mentioned in the recommendation in question, even increases the reliability of the detection.

Also with lower frequency algorithms, such as alternately using and not using three samples, it is found that one or more of the frequencies used cannot be reliably detected any more.

FIG. 3 shows a preferred embodiment of a device according to the invention for detecting MFC (multi-frequency code) signalling signals in each of the eight channels of two frames.

In accordance with international agreements, PCM-samples for signalling are offered in a 125 µs frame comprising 32 time slots (see FIG. 4). The incoming PCM-samples with MFC signalling are distributed in the exchange over time slots T0, T4, T8, T12, T16, T20, T24 and T28. So there are 8 MFC signalling channels with a channel spacing of 15.6 µs.

The detection device is controlled by the central processing unit of the telephone exchange (not shown). The operation of this central processing unit is of no importance in explaining the invention and can therefore be left out of consideration. An MFC detection device for both the outgoing and the incoming direction will comprise 12×2 reference series and 6×2 accumulators. By designing the detection device in such a way that detection of a sample from a time slot is completed within 15.6 µs, the detection device can, according to the invention, in the intervening time be used for processing the MFC-signals from another frame.

FIG. 3 shows such a device in which a multi-channel PCM-signal A is received on an input 23 and a multi-channel PCM-signal B on an input 24, of which PCM-signals each time the parts containing the MFC-signals are fed to input bus 26 by the input selector 25. Input selector 25 operates under the control of a synchronization signal FS (see FIG. 4), which becomes "high" during each time the eight time slots T0-T28, and of a synchronization signal AS, which according to the invention changes its sign every two frames f and as a result alternately feeds two of each of the time slots with signalling information from PCM-signal A, and then two of each of the time slots with signalling information from PCM-signal B to input bus 26.

The synchronization characters FS and AS are direct derivatives of the signal received by the telephone exchange. The formation of these signals is generally known and will not be discussed here.

Figure 6:
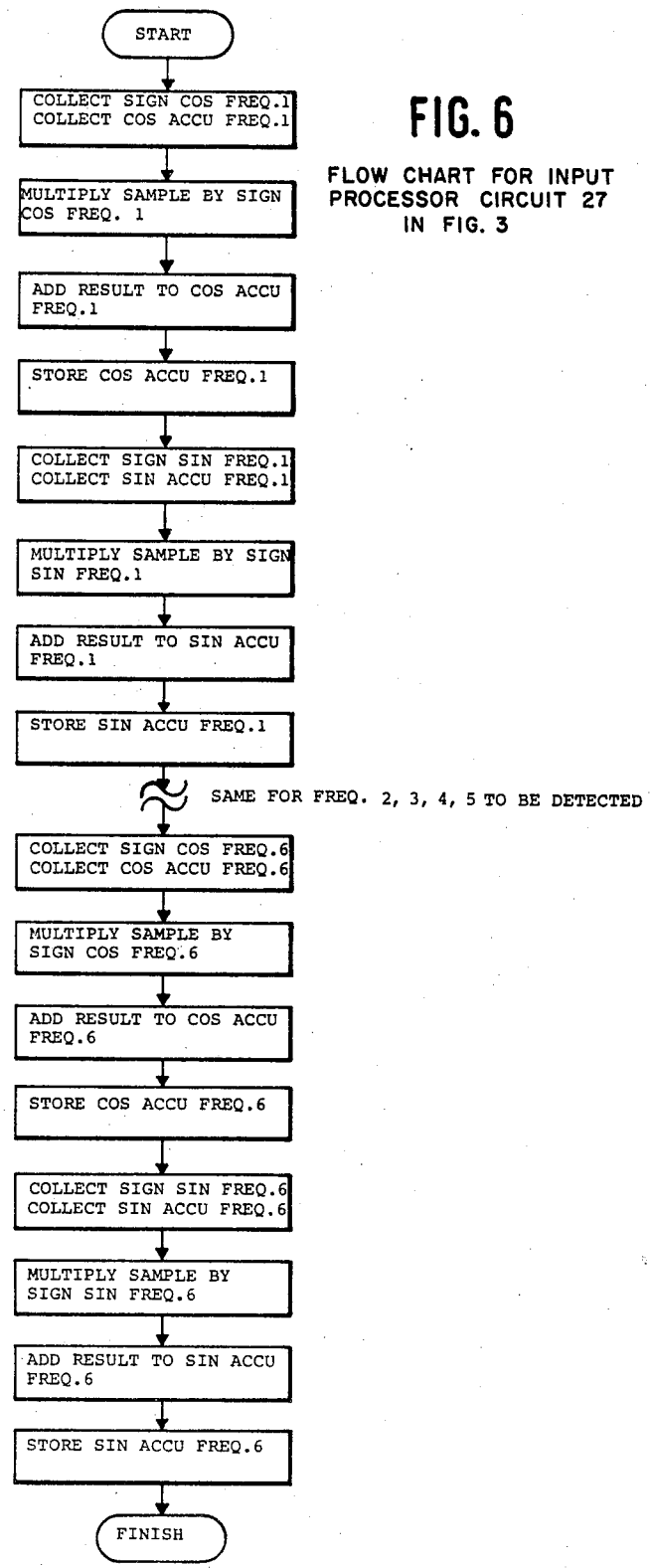

The signal from input bus 26 (see FIG. 3) is fed to an input processing circuit 27. Circuit 27 processes each incoming signal in the same way without distinguishing between channels. FIG. 6 is a flowchart of circuit 27, corresponding to the discriminator circuits 6 shown in FIG. 2, which consists of part of a microprocessor circuit.

Input control circuit 28 is realized together with circuit 27 by means of a microprocessor; the two circuits have been drawn separately in order to emphasize the two different functions. Circuit 28 sees to it that at the right moment the right data is released to enable circuit 27 to carry out an operation according to the flow chart of FIG. 5. Circuit 28 is linked to the frame by means of synchronization signals FS and AS (FIG. 4).

The reference series are stored in a programmable read-only memory (PROM), reference series buffer 29. As stated above, it contains 12 sine reference series and 12 cosine reference series.

Further, the circuit comprises an accumulator 30 for frame of signals A, in which the data are accumulated in the known manner after having been processed by circuit 27. Accumulator 30 has been embodied as a random access memory (RAM). It contains the accumulated data for eight PCM time slots, notably T0, T4, T8, T12, T16, T20, T24 and T28 (see FIG. 4). For each of these eight channels, accumulator 30 comprises 14 lines, so that the total capacity of the accumulator is at least 8×14=112 lines. An RAM of 16×128 bits is applied in the circuit. The fourteen lines are used for the accumulated values of the sine and cosine of each of the six frequencies that may occur in a signal, and the last two lines are used for a status word. The status word comprises, among other things, the address of the detection device, the number of samples processed and the condition of the detection device.

Likewise, an accumulator 33, identical to accumulator 30, has been provided for the accumulated data of the frame of signals B, with an address selector 34 and a data selector 35.

For the exchange of signals, an input address bus 36 has been provided via which input control circuit 28 can feed address information to buffer 29 and address selectors 31 and 34. Via input control bus 37, circuits 27 and 28 can give orders to each other and to buffer 29 and selectors 32 and 35. The data to be processed are exchanged via a bidirectional input data bus 38.

The circuit in FIG. 3 also incorporates an output processing circuit 40 for processing the data stored in the accumulators 30 and 33, and an output control circuit 41. Output circuits 40 and 41 have been jointly embodied as one micropressor and have been drawn separately because of their different functions. The functional operation of output circuits 40 and 41 is illustrated by FIGS. 8 and 7, respectively. The data processed by output circuit 40 can be fed to the central processing unit of the telephone exchange via output buses. In the same way as in the input section. These output connections are provided by means of an output address bus 46, an output control bus 47 and a bidirectional output data bus 48.

Input control circuit 28 and output control circuit 41 can both effect changes in each of the status words associated with each of the eight time slots. This presents the possibility of an exchange of messages between circuits 28 and 41. The operation of the circuit according to FIG. 3 will be illustrated by means of FIGS. 4, 5, 6, 7 and 8. The microprocessors incorporated in the circuit, namely the combination of input circuits 27 and 28 and that of output circuits 40 and 41, will not be further explained. For insiders these circuits have been sufficiently described by the flowcharts of FIGS. 5, 6, 7 and 8.

Input control circuit 28 waits for signal AS to change its sign. As appears from FIG. 3, this causes accumulator 30 to become accessible when signal AS is "high", or causes accumulator 33 to become accessible when signal $\overline{AS}$ is "low". After the change of signal AS, circuit 28 waits till signal FS also becomes "high", after which it is investigated whether the status word associated with time slot T0 contains a detection order. If there is an order in time slot T0, the input control circuit 28 determines the starting address of the character bits in the reference series buffer 29 and the starting address in selector 31 or 34, respectively of the accumulated values for time slot T0 in accumulator 30 or 33, depending on signal AS. Thus input control circuit 28 now regularly places an address on address bus 36 and orders the input processing circuit 27 via control bus 37 to collect the data from the accumulator in input control circuit 27 and to add them to the result of the multiplication of the samples from input selector 25 and reference series buffer 29, respectively, and to place the final result in the accumulator 30 or 33. This process is repeated for each of the six frequencies that may be found in each time slot FS (see FIGS. 4 and 6).

This same process is applied to the signals in time slots T4, T8, T12, T16, T20, T24 and T28.

As FIG. 4 shows, two frames f of one PCM-channel are processed in succession each time, and then two frames f of a second PCM-channel. The results of the first PCM-channel are stored in accumulator 30 each time via data selector 32, and the results of the second PCM-channel are fed to accumulator 33 via data selector 35.

According to the invention the number of samples of each time slot required equals half a multiple of the number of samples by means of which a 120 Hz period (the fixed difference frequency between the MFC frequencies) can be defined.

At a given sampling frequency of 8 kHz, a 120 Hz period is defined by sixty-seven samples. Two periods are defined by one hundred thirty-four samples and three periods by two hundred samples. By choosing each time a multiple of sixty-seven samples, the samples of the positive and negative parts of the sine and cosine of 120 Hz cancel each other out when multiplied.

In the device described here two hundred samples have been chosen, so that after cancellation of half of this number, a detection is complete after one hundred samples. Each time when 50×2 frames have been processed and accumulated, input control circuit 28 changes the status word stored in accumulators 30 and 33 and discontinues the processing of the signals received.

When the central processing unit (not included in the Figures) has given a detection order via input 43 (FIGS. 3 and 7) and output control circuit 41 concludes from the status word in the accumulator 30 or 33 concerned that the detection procedure is completed, the results of the accumulation are fed to the working store of the input processing circuit 40 under the control of the output control circuit 41. According to flowchart of FIG. 8 these data are now processed. The moduli of the values of the cosine accumulator and those of the sine accumulator of one frequency are compared with each other. Subsequently, the smaller of the two values is multiplied by a factor $\frac{1}{8}$, $\frac{1}{4}$ or $\frac{3}{8}$. The multiplication factor depends on the ratio between the largest and the smallest accumulator value. The largest value and the smallest value multiplied by the factor are now added together in this output processing circuit 40. A similar operation is carried out on the values of the sine and cosine accumulators of the other frequencies. After that, the frequency combination of the values of the two largest processing results is determined and passed on to output control circuit 41.

If the detection has been unsuccessful, a new detection order is given; if the detection has been successful, the result is stored in output buffer 44, where it can be collected by the central processing unit (not included in the Figures).

With the device described in the aforegoing it proves to be possible to detect an MFC-signal within 25 ms, detection taking place in a total of 17 MFC-channels from two different PCM-channels as a result of the application of time division. This is subject to the condition that the eight MFC-channels are regularly distributed over the frame. This need not be a drawback because, in a telephone exchange operating on a time division basis, the incoming signalling signals can be distributed regularly in time via the first time interval of the exchange.

While there is described above the principles of this invention in connection with specific apparatus, it is to be clearly understood that this description is made only by way of example and not as a limitation to the scope of this invention.

What we claim is:

1. A method for detecting pulse code modulated multi-frequency code signals in at least one signal channel comprising the steps of:

(A) separately storing said signals from each channel, (B) alternately selecting at least two successive sample signals from each of said channels, (C) detecting at least one multi-frequency signal in each selected sample, (D) modulating each detected signal by two separate given multiples to produce two types of signals from each sample, (E) separately storing the resulting multiple-type signals, (F) alternately selecting said separately stored multiple-type signals, (G) comparing said selected multiple-type signals, and (H) transferring said compared multiple-type signals for further processing.

2. A method according to claim 1 wherein said pulse code modulated signals are from at least two signal channels.

3. A method according to claim 1 wherein said alternate selection is carried out at a frequency at least four times that of the highest frequency to be detected.

4. A method according to claim 1 wherein said two separate given multiples are phase-shifted 0 and $\pi$ with respect to each other.

5. A method according to claim 1 wherein said two separate multiples are sine and cosine signals.

6. A method according to claim 1 wherein the number of samples used for detection is about half the number of samples available in one period.

7. A detecting device for at least two signal channels comprising:

(A) a selection means (3) for alternately selecting two samples of a first channel signal and two samples of a second channel signal, (B) a control signal (AS) the period of which has a length equal to the time in which four samples occur of each of the channel signals to be considered, (C) a discriminating circuit (6) for each frequency to be detected incorporating a detection device (14) which multiplies the signal to be investigated by each of two reference series signals, (D) accumulators (18–21) for storing the multiplied results, and (E) a comparator circuit (10) connected to the outputs of said accumulators.

8. A device according to claim 7 wherein said accumulators comprise a first accumulator (18) and a second accumulator (20) for the first channel signal, and a third accumulator (19) and a fourth accumulator (21) for the second channel signal, said device including switching means (17) for feeding the results of the processing by said detection device (14) alternately to said first and second accumulators and alternately to said third and fourth accumulators, and also including additional switching means (22) for feeding alternately the accumulated values of each of the signals in said accumulators to said comparator circuit (10), these said switching means being controlled at the pace of said control signal AS.

9. A device according to claim 7 wherein said two signal channels comprise two PCM frames of 32 time slots each, each time slot being successively processed, and the signals in said time slot being stored in a separate accumulator (30 and 33) for each PCM frame.

10. A device according to claim 9 wherein the signal processing components comprise:

(A) a first input (23) for one of said PCM frames and a second input (24) for the other of said PCM frames, (B) an input selector (25) for alternate through connection of said two PCM frames from said first and second input, (C) a reference series buffer (29) for storing said two reference series signals for each of said frequencies, (D) a micro-processor circuit comprising an input processing circuit (27) for adding the data from said reference series signals buffer (29) and said input selector (25), and (E) an input control circuit (28) for indicating the addresses of said sample signals.

11. A device according to claim 9 characterized in that the components for processing the accumulated data comprise:

(A) an input buffer (42) for reception of instructions, (B) an output buffer (44) for temporary storage of detection results, (C) a micro-processor comprising an output processing circuit (40) for processing the results stored in said accumulators (30, 33) according to a fixed procedure (see flow chart of FIG. 8), and (D) an output control circuit (41) for controlling said output processing circuit (40) according to a fixed procedure (see flow chart of FIG. 7).

12. A method for detecting the presence or absence of at least one of a predetermined number of frequencies having the same frequency distance between them, in a pulse code modulated signal channel, comprising the steps of:

(A) separating storing said signals, (B) alternately selecting two successive sample signals and ignoring the next two signals, (C) multiplying each sample signal with a sine sample and a cosine sample of each of the frequencies to be detected, (D) separately accumulating the resulting multiple-type signals, (E) calculating the accumulated values of the sine and cosine multiple-type signals for each of said frequencies, (F) comparing said calculating products, and (G) transferring the largest value of the calculated products for further processing.

13. A method according to claim 12 comprising the step of alternately selecting two successive sample signals and ignoring the other two out of each of two different channels.

* * * * *

UNITED STATES PATENT AND TRADEMARK OFFICE
CERTIFICATE OF CORRECTION

PATENT NO. : 4,279,017
DATED : July 14, 1981
INVENTOR(S) : Bernardus W. Bos et al It is certified that error appears in the above-identified patent and that said Letters Patent are hereby corrected as shown below:

Column 4, line 16, change "each time" to -- only --. Column 6, line 33, change "1/4" to -- 2/8 --. Column 8, line 42, change "separating" to -- separately --.

Signed and Sealed this

Twenty-seventh Day of October 1981

[SEAL]

Attest:

GERALD J. MOSSINGHOFF

Attesting Officer

Commissioner of Patents and Trademarks